UNITED STATES PATENT OFFICE.

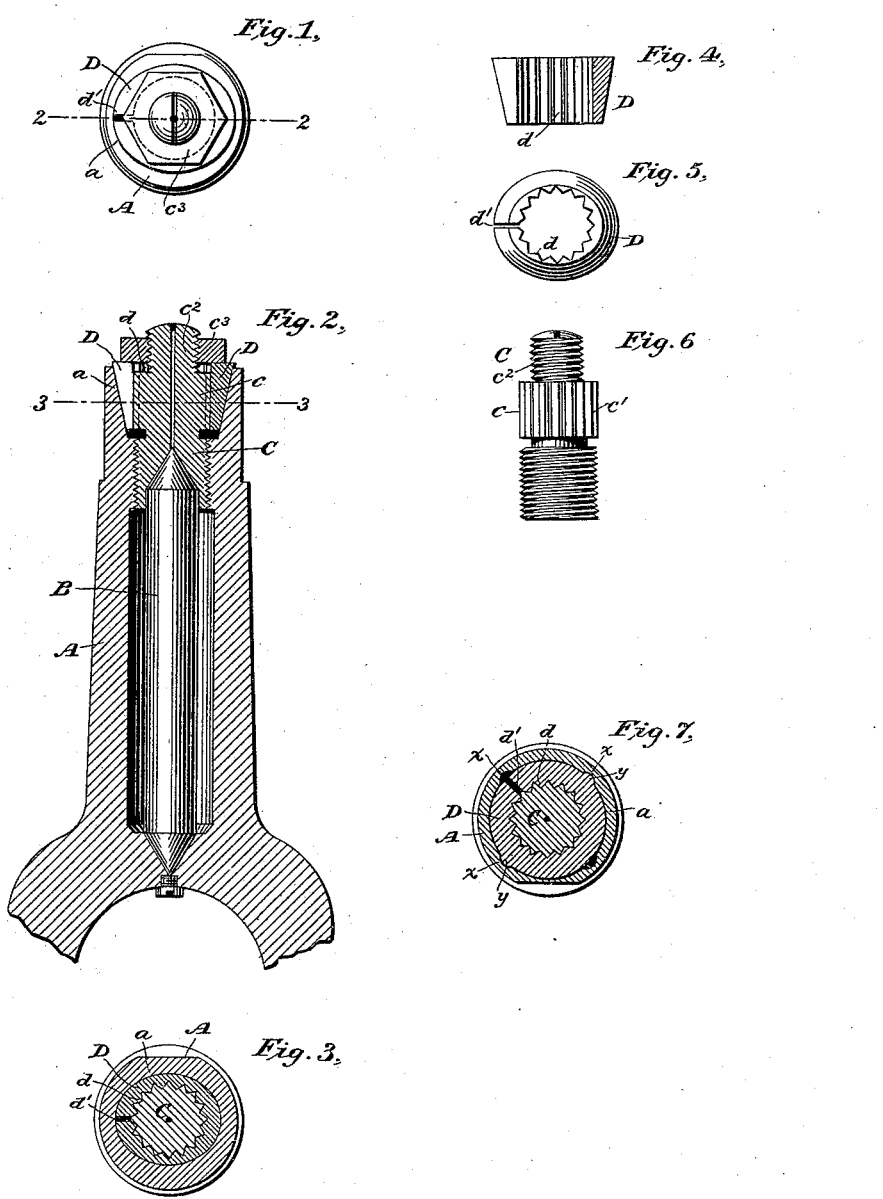

FRANK D. RANDOLPH, OF PLAINFIELD, NEW JERSEY, ASSIGNOR OF ONE-HALF TO ROBERT GORTON, OF SAME PLACE.

BICYCLE.

SPECIFICATION forming part of Letters Patent No. 373,028, dated November 8, 1887.

Application filed August 17, 1887. Serial No. 247,192. (No model.)

*To all whom it may concern:*

Be it known that I, FRANK D. RANDOLPH, of Plainfield, in the State of New Jersey, have invented a certain new and useful Improvement in Bicycles, of which the following is a specification.

The invention relates to the head-bearing, upon which the leading-wheel and backbone swing relatively to each other. It is important that this bearing should be so constructed as to be readily adjustable to compensate for wear, and yet be so secured when adjusted that it cannot work loose.

The objection to all the styles of bearings now in use of which I am aware is that no matter how tightly they may be screwed up in use they become loose from the constant jarring of the machine and require constant attention and frequent adjustment.

The object of my invention is to provide a simple and practical arrangement for obviating this difficulty, which may readily be applied to the styles of machine now in use with but slight alteration and small expense.

The construction and operation will be fully understood from the following description and drawings.

Figure 1 is a top view of so much of a bicycle-head as is necessary to illustrate the invention; Fig. 2, a vertical section therethrough on the line 2 2 of Fig. 1; Fig. 3, a tranverse section on the line 3 3 of Fig. 2; Fig. 4, a sectional view of the locking-sleeve detached, also taken on the line 2 2 of Fig. 1. Fig. 5 is a bottom view of the locking-sleeve. Fig. 6 is a view of the upper vertically-adjustable bearing plug or bolt; and Fig. 7 shows a modified construction, the view being taken on the same line as in Fig. 3.

A represents an ordinary socket-head, in which the vertical bearing-pin B, with which the backbone is rigidly connected, works. The upper adjustable bearing consists of a screw-threaded plug, C, working in the threaded socket A, and recessed to form a conical bearing for the pin B. This arrangement, omitting the illustrated construction of the plug C, is common, and the parts are usually secured by a lock-nut on the upper end of the plug. In my improved construction, however, the mouth of the socket A, above its screw-threaded portion, is enlarged, as at $a$, and is preferably conical in vertical section, and oval or of other irregular or non-circular shape in cross-section, though the base of the sleeve and bottom of opening may be round and shade off into an oval. The portion $c$ of the plug C at this point, instead of being screw-threaded, is provided with a circular hub or enlargement having vertically-cut teeth or ribs or corrugations $c$ $c'$. The upper end, $c^2$, of the plug is reduced in size and screw-threaded for the reception of the ordinary lock-nut $c^3$. To securely lock the bearing the locking-sleeve D is employed. Its interior bore, $d$, is shaped to correspond with the portion $c$ of the plug and its exterior contour to fit the opening or socket $a$. Preferably it is slit on one side at $d'$, to allow play and give it elasticity. When the bearing is properly set or adjusted, the locking-sleeve D is dropped into place over the plug C, its interior teeth, ribs, or corrugations interlocking with those $c'$ on the hub and the lock-nut screwed up. Obviously it will be impossible for the bearing to work loose, since the shape of the socket $a$ and sleeve D are such that the sleeve cannot turn therein.

The construction illustrated is that which I prefer; but of course any mechanic can vary it without departing from the invention. If the socket-opening $a$ were of the same diameter as its screw-threaded portion and the size of the portion $c$ of the plug reduced to afford room for a locking-sleeve, of course the principle would be the same. So, also, it is not material that the socket and sleeve should be conical in vertical section or of any particular cross-section. The invention may, therefore, be stated to consist in part of the combination of the socket-head and bearing-pin, the adjustable bearing-plugs, a locking-sleeve for locking the plug, and devices for locking the sleeve or preventing its rotation. It will be understood, therefore, that in this aspect of the case the shape of the socket and sleeve are really immaterial provided some means be supplied whereby the sleeve may be locked.

In Fig. 7 is indicated a socket, $a$, circular in cross-section and having recesses $x$, into which lugs $y$ on the sleeve enter.

I claim as my invention—

1. The combination of the socket-head, the bearing-pin, and adjustable bearing-plug, a locking-sleeve enveloping the plug and preventing its rotation, and means for locking the sleeve against rotation, for the purpose set forth.

2. The combination of the socket-head, the bearing-pin, an adjustable bearing-plug, a locking-sleeve enveloping the plug and preventing its rotation, means for locking the sleeve against rotation, and the lock-nut on the end of the bearing-plug.

3. The combination of the socket-head having the screw-threaded portion and an opening above it of irregular cross-section, the bearing-pin, the bearing-plug vertically adjustable in the screw-threaded portion of the socket and having a ribbed or toothed portion, C, and a locking-sleeve having an interior bore shaped to interlock with the portion c, and an exterior contour to fit said opening in the socket-head, substantially as set forth.

4. The combination of the socket-head A, the bearing-pin B, the plug C, having the portion c, the sleeve D, constructed substantially as described and adapted to be seated in the opening of the socket-head, as and for the purpose set forth.

5. The combination of the socket-head A, the bearing-pin B, the plug C, having the portion c, and the slit sleeve D, conically shaped in vertical section and oval in cross-section and adapted to be seated in the opening of the socket-head, for the purpose set forth.

In testimony whereof I have hereunto subscribed my name.

FRANK D. RANDOLPH.

Witnesses:
ROBERT GORTON,
JOHN H. VAN WINKLE.